(12) United States Patent
Bergbach

(10) Patent No.: US 7,176,444 B2
(45) Date of Patent: Feb. 13, 2007

(54) PRECISION ADJUSTABLE LIGHT BARRIER

(75) Inventor: Roland Bergbach, Kenzingen (DE)

(73) Assignee: Sick AG, Waldkirch (DE)

( * ) Notice: Subject to any disclaimer, the term of this patent is extended or adjusted under 35 U.S.C. 154(b) by 191 days.

(21) Appl. No.: 10/986,563

(22) Filed: Nov. 10, 2004

(65) Prior Publication Data
US 2005/0161591 A1    Jul. 28, 2005

(30) Foreign Application Priority Data
Nov. 14, 2003 (DE) .................. 203 17 622 U

(51) Int. Cl.
*H01J 40/14* (2006.01)
(52) U.S. Cl. ........................ 250/221; 72/21.1
(58) Field of Classification Search .......... 250/221, 250/222.1; 72/14.3, 21.1, 21.3; 340/555–557
See application file for complete search history.

(56) References Cited

U.S. PATENT DOCUMENTS

| 3,535,539 A | 10/1970 | Malespina et al. |
| 2002/0134922 A1* | 9/2002 | Appleyard et al. ......... 250/221 |

FOREIGN PATENT DOCUMENTS

| DE | 195 33 044 A1 | 4/1996 |
| DE | 297 11 259 U1 | 9/1997 |
| DE | 198 01 915 A1 | 7/1998 |
| DE | 297 09 961 U1 | 7/1998 |
| DE | 198 50 270 A1 | 5/1999 |
| DE | 199 07 548 C2 | 9/1999 |
| DE | 201 21 829 U1 | 6/2003 |
| EP | 0 005 853 A1 | 12/1979 |
| EP | 0 422 685 B1 | 2/1995 |
| EP | 0 658 718 B1 | 6/1999 |
| EP | 0 964 273 A2 | 12/1999 |
| WO | WO 00/67932 A1 | 11/2000 |

* cited by examiner

*Primary Examiner*—Thanh X. Luu
(74) *Attorney, Agent, or Firm*—Townsend and Townsend and Crew LLP

(57) ABSTRACT

A light barrier having a light emitter (9) spaced apart from a light receiver (10), the emitter including a light source (12) and transmission optics (13) emitting a substantially parallel light beam 11. The light receiver (10) and the light emitter (9) are aligned with each other for focusing the light beam (11) from the light emitter (9) by means of reception optics (15) on a reception element (17) for generating an electrical signal as a function of the light received. A partially reflecting optical boundary surface between the reception optics (15) and the reception element (17), and an alignment plate (18) which includes a light entry opening (19) and a target disk (20), are positioned in front of the reception optics (15) and are used for aligning the light receiver (10) and the light emitter (9).

14 Claims, 2 Drawing Sheets

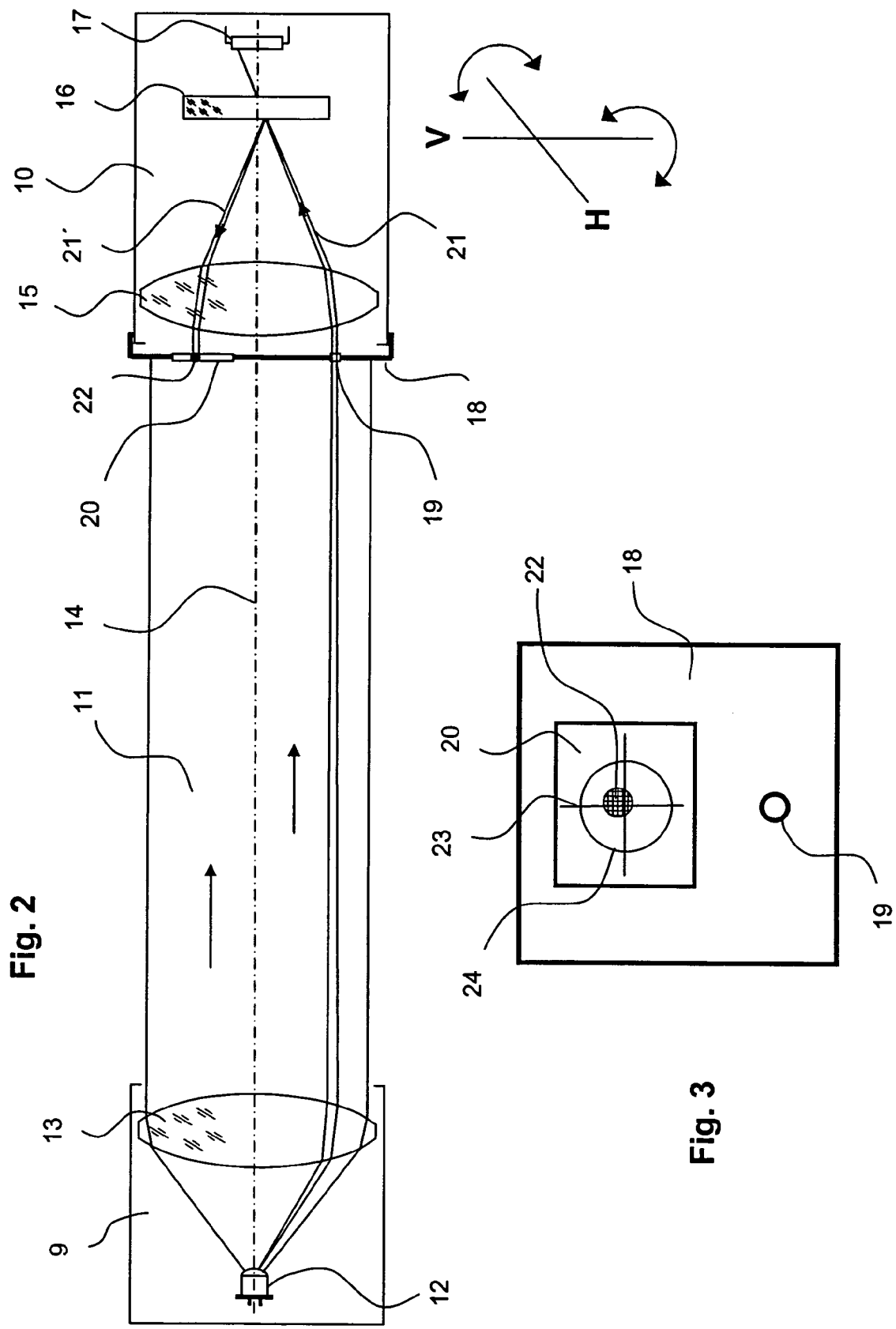

PRECISION ADJUSTABLE LIGHT BARRIER

BACKGROUND OF THE INVENTION

The invention concerns a light barrier with a light emitter spaced apart from a light receiver, the emitter including a light source and transmission optics and emitting a substantially parallel light beam. The light receiver and the light emitter are arranged to be aligned with each other for focusing the light beam from the light emitter by means of reception optics on a reception element for generating an electrical signal as a function of the light received.

Such light barriers are used for the contactless detection of objects. In particular, when these light barriers are used to prevent accidents at machine tools, such as bending or edging presses, they must be exactly aligned during installation so that they function reliably. The necessary exact alignment is predicated upon the fact, among others, that the sending and receiving angle must be kept as small as possible (less than 2.5°), to prevent reflections and resulting failures to recognize objects. Likewise, for light barriers with small sending and receiving angles, the influence from neighboring systems and the sensitivity to stray light are very limited or entirely prevented. Special importance attaches to the alignment of a light transmitter and a light receiver in situations where the reception element is composed of multiple individual photocells arranged in line or matrix form. In such a case, a faulty alignment would have the result that the information contained in the distribution of light in the beam cross-section cannot be fully evaluated.

Besides the exact alignment during the installation of the light barrier, the corresponding attachment components must have a high degree of mechanical stability.

To make such alignments possible, a variety of alignment aids are known. When the distance from the light emitter to the light receiver is large, the alignment can be done with a permanently installed or externally adaptable sighting telescope. It is also known how to make alignments with the help of the light barrier's signal. In this method, the orientation of the light emitter and the light receiver is changed until the reception signal reaches a maximum. For this, it is known to change the pulsing frequency of an indicator diode as a function of the magnitude of the reception signal, for example.

Drawbacks of these known methods for adjusting the light barrier are, for example, in the sighting telescope solution, the associated costs and the amount of space required, and in the solution using the reception signal, the time it takes to attain the desired orientation.

SUMMARY OF THE INVENTION

It is an objective of the present invention to provide a light barrier with an improved alignment device that reduces the alignment time and, most importantly, that ensures the precise alignment of the light receiver and the light emitter needed for its secure functioning.

This objective is attained with a light barrier that has a light emitter spaced apart from a light receiver. The emitter includes a light source and transmission optics and emits a substantially parallel light beam. The light receiver and the light emitter are arranged to be aligned with each other for focusing the light beam from the light emitter by means of reception optics on a reception element for generating an electrical signal as a function of the light received. The light barrier has a partially reflecting optical boundary surface between the reception optics and the reception element, and an alignment plate that includes a light entry opening and a target disk formed to be positioned in front of the reception optics for aligning the light receiver and the light emitter, with the light entry opening being offset relative to an optical axis of the reception optics.

A further embodiment of the invention employs adjustable holders that are secured to a movable tool of the press. This has the benefit that, during the working movement of a portion of the protected machine, for example a movable tool, the protection mechanism moves with the movable tool. This preserves the accurate orientation of the light barrier at the protection zone.

The advantage of the present light barrier is that it uses an economical alignment plate with a light entry opening and a target disk. By employing the reflection at an optical boundary area of the light receiver, the light receiver can be precisely aligned with the light emitter. In particular, if the beam cross-section at the light receiver is relatively large, a large target disk with a large capture range can be used and the benefits of this arrangement become very pronounced.

Since the diameter of the light entry opening in the alignment plate is only a few millimeters in size (around 5% of the reception optics entry surface), the light spot produced by it is quite conspicuous, even without using further imaging optics.

In an advantageous embodiment of the alignment plate, the light entry opening, the optical axis of the reception optics, and the target disk are arranged so that they lie on a common line. Thus, when the light entry opening is arranged in a marginal area of the reception optics, a maximum remaining area of the reception optics is available for the size of the target disk. The large target disk made possible in this way has the consequence that the visual field depicted on the target disk covers a large capture range. For this reason, the alignment aid can already be used for a rough alignment of the light receiver and the light emitter.

The target disk on the alignment plate is fashioned as a translucent, matte glass disk, so that the light spot indicating the alignment status is little attenuated in its intensity and therefore can be seen with good contrast.

For aiming the light spot exactly at the optimal alignment point when aligning the light receiver, sighting lines, and preferably annular sighting lines arranged around a nominal point, are arranged on the target disk.

According to the invention, the light spot generated by the light entry opening is reflected onto the target disk inside the light receiver. A convenient arrangement for this uses the surface reflection at the optical boundary surface of an optical filter in the light receiver, rather than an additional mirror provided for this reflection in the light receiver. In a modification of this embodiment of the invention, the extent or degree of reflectivity at the surface reflecting the light spot can be adjusted by applying optical coatings.

The light barrier with the alignment plate and internal reflecting surface of the present invention is especially advantageous when the receiver element has several individual photocells arranged in line or matrix form. For such light barriers, which are used not only to recognize the presence of an object in the path of a light beam, but also to furnish information at the same time as to the position of the object inside the cross-section of the light beam, a precise alignment of the light receiver on the light emitter is particularly important. The present invention for avoiding faulty alignments thus also assures an optimal function in terms of object recognition across the light beam cross-section.

Finally, in another embodiment of the invention, adjustable holders are used for securing the light emitter and the light receiver as a safety mechanism for monitoring a protection zone of a given machine, especially a press.

In one embodiment of the invention, adjustable holders for the light emitter and receiver are attached to movable portions of the tool. This has the benefit that, during the working movement of a portion of the protected machine, for example a movable tool, the protection mechanism moves with the movable tool. This preserves the accurate orientation of the light barrier at the protection zone.

The invention is hereafter explained in more detail with reference to the drawings.

BRIEF DESCRIPTION OF THE DRAWINGS

FIG. 2 is a schematic cross-section through a light barrier along its optical axis;
and
FIG. 3 shows a sample configuration of an alignment plate.

DESCRIPTION OF THE PREFERRED EMBODIMENTS

Figure 1:
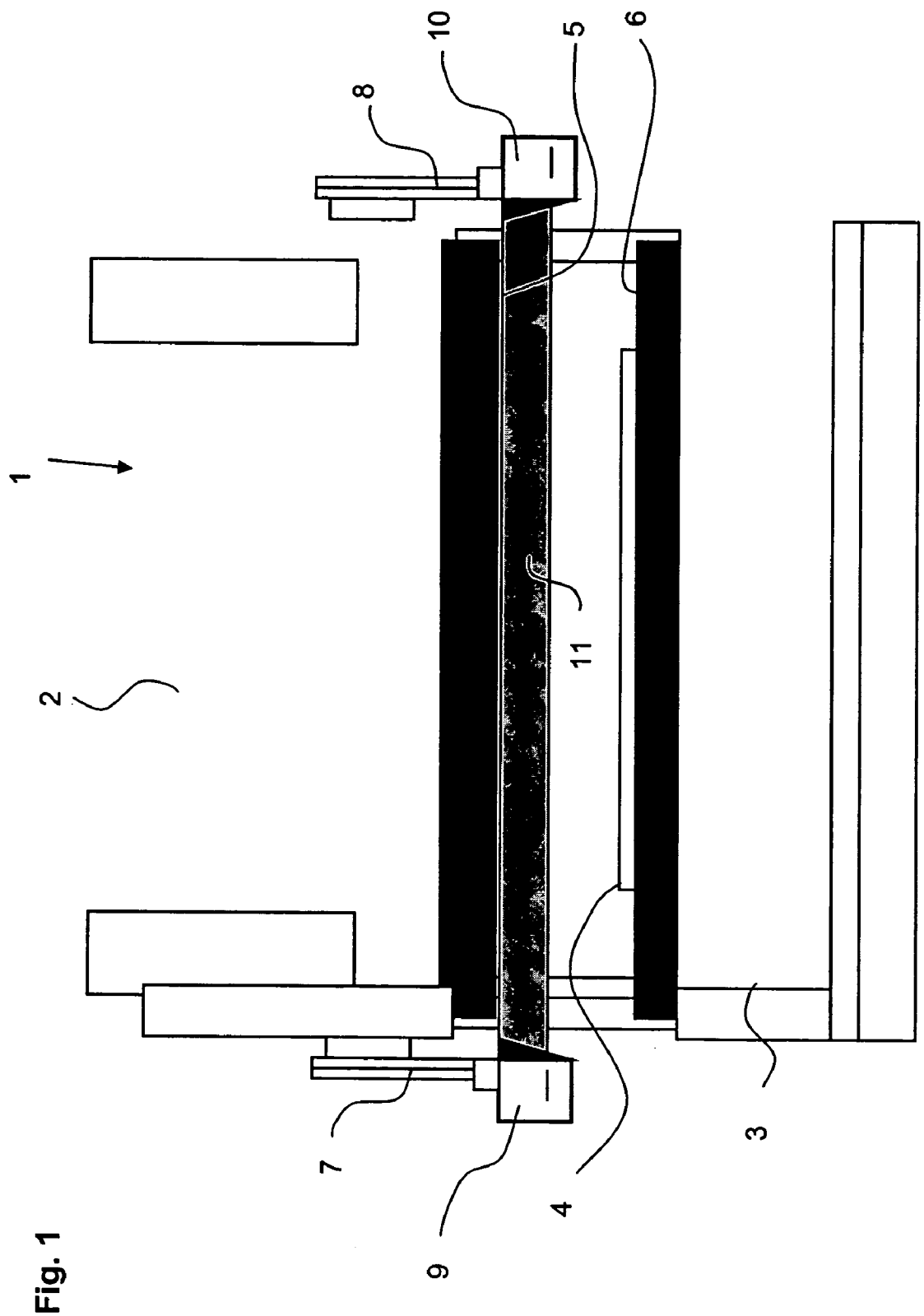
FIG. 1 is a schematic front view of a bending press.

A bending press 1 shown in FIG. 1 has a movable tool 2 which moves vertically downward during a working cycle towards a stationary tool 3. Between the movable tool 2 and the stationary tool 3 is a workpiece 4 that is to be worked. The movable tool 2 and the stationary tool 3 have coordinated tool edges 5 and 6 for working workpiece 4. During a working cycle, the distance between the two tool edges 5 and 6 gradually diminishes. The working cycle of the bending press is under the control of a control unit (not shown). A triggering signal for this can be activated by a hand or foot switch, or with an automatic machine timer.

A light barrier having a light emitter 9 and a light receiver 10 is mounted on movable tool 2 with two adjustable holders 7 and 8. The installation of light emitter 9 and light receiver 10 is such that a bundle or array of rays 11 is formed between light emitter 9 and light receiver 10 directly in front of tool edge 5. If, during the vertical downward movement of the movable tool 2, an object, such as a hand or a finger, enters the bundle of rays 11, the light barrier senses the entry and communicates this to the control unit, which then immediately stops the movement because of the danger it represents.

FIG. 2 shows the light emitter 9 with a light source 12 and transmission optics 13. The transmission optics 13 shapes the light from light emitter 12 into an array of approximately parallel rays 11 which is directed at light receiver 10. Along an optical axis 14 of light receiver 10 are reception optics 15, an optical filter 16 and a receiving element 17. The optical filter 16 protects receiving element 17, which preferably comprises an array of receiving elements when the light barrier is used to safeguard a press against undesirable interference from stray or outside light when the press operates.

As is shown in FIG. 2, an alignment plate 18 is placed precisely and reproducibly on light receiver 10 in front of reception optics 15 and has a light entry opening 19 and a target disk 20. Alignment plate 18 only allows a small segment 21 of the incoming light beam 11 in the region of light entry opening 19 to enter into the light receiver. After being deflected at the reception optics 15, light beam segment 21 impinges on an optical boundary surface of filter 16. A portion of the light beam segment 21 is reflected by the filter as a light beam portion 21', and after passing through reception optics 15 it once again strikes target disk 20. Since the target disk 20 is made, for example, as a matte ground glass disk, a light spot 22 is produced at the point of incidence of light beam portion 21' on the target disk. If the light receiver 10 is rotated about a vertical axis V, the light spot 22 will move on the target disk 20 along a line that is perpendicular to the plane of the drawing. In similar fashion, when the light receiver 10 is turned about a horizontal axis H, the light spot 22 on the target disk 20 moves along a line which lies in the plane of the drawing.

During the normal operation of the light barrier, the alignment plate is removed from and kept outside of the optical beam path until needed for another alignment.

FIG. 3 shows a sample embodiment of alignment plate 18. It shows light entry opening 19 in a lower region and target disk 20 in an upper region. At the center of the target disk 20 is a crosshair 23 that establishes a nominal point, as well as a circular line 24 surrounding the nominal point. Thus, depending on the position of the light spot 22 inside the target disk 20, the alignment accuracy of light receiver 10 in relation to light emitter 9 can be seen.

What is claimed is:

1. A light barrier having a light emitter spaced apart from a light receiver, the emitter including a light source and transmission optics and emitting a substantially parallel light beam, the light receiver and the light emitter being arranged to be aligned with each other for focusing the light beam from the light emitter by means of reception optics on a reception element for generating an electrical signal as a function of the light received, characterized by having a partially reflecting optical boundary surface between the reception optics and the reception element, and an alignment plate including a light entry opening and a target disk formed to be positioned in front of the reception optics for aligning the light receiver and the light emitter, wherein the light entry opening in the alignment plate is offset relative to an optical axis of the reception optics.

2. A light barrier according to claim 1, characterized in that a surface area of the light entry opening in the alignment plate is about 5% of an entry surface of the reception optics.

3. A light barrier according to claim 1, characterized in that the alignment plate is adapted to be arranged in front of the reception optics so that the light entry opening, an optical axis of the reception optics, and the target disk are on a common line.

4. A light barrier according to claim 1, characterized in that the target disk on the alignment plate comprises a matte, translucent disk.

5. A light barrier according to claim 1, characterized in that target disk includes annular lines arranged about a nominal point.

6. A light barrier according to claim 4, characterized in that the partially reflecting optical boundary surface of the light receiver is a light entry side of an optical filter.

7. A light barrier according to claim 1, characterized in that the reception element comprises a plurality of individual photocells arranged in one of a line and a matrix form.

8. A light barrier according to claim 1, characterized by a safety mechanism having adjustable holders securing the light emitter and the light receiver to a machine.

9. A light barrier per claim 8, characterized in that the adjustable holders are secured to a movable tool of the press.

10. A light barrier according to claim 8 wherein the machine comprises a press.

11. A light barrier having a light emitter spaced apart from a light receiver, the emitter including a light source and transmission optics and emitting a substantially parallel light beam, the light receiver and the light emitter being arranged to be aligned with each other for focusing the light beam from the light emitter by means of reception optics on a reception element for generating an electrical signal as a function of the light received, characterized by having a partially reflecting optical boundary surface between the reception optics and the reception element, and an alignment plate including a light entry opening and a target disk formed to be positioned in front of the reception optics for aligning the light receiver and the light emitter, wherein the target disk on the alignment plate comprises a matte, translucent disk.

12. A light barrier according to claim 11, characterized in that the light entry opening in the alignment plate is offset relative to an optical axis of the reception optics.

13. A light barrier having a light emitter spaced apart from a light receiver, the emitter including a light source and transmission optics and emitting a substantially parallel light beam, the light receiver and the light emitter being arranged to be aligned with each other for focusing the light beam from the light emitter by means of reception optics on a reception element for generating an electrical signal as a function of the light received, characterized by having a partially reflecting optical boundary surface between the reception optics and the reception element, and an alignment plate including a light entry opening and a target disk formed to be positioned in front of the reception optics for aligning the light receiver and the light emitter, wherein the partially reflecting optical boundary surface of the light receiver is a light entry side of an optical filter.

14. A light barrier according to claim 13, characterized in that the partially reflecting optical boundary surface includes optical layers for adjusting a reflectivity of the surface.

* * * * *